United States Patent
Daube et al.

(10) Patent No.: US 12,223,588 B2
(45) Date of Patent: Feb. 11, 2025

(54) THREE DIMENSIONAL SCENE INPAINTING USING STEREO EXTRACTION

(71) Applicant: Snap Inc., Santa Monica, CA (US)

(72) Inventors: Nir Daube, Pacific Palisades, CA (US); Zachi Karni, Givat Ella (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/142,217

(22) Filed: May 2, 2023

(65) Prior Publication Data

US 2023/0281916 A1 Sep. 7, 2023

Related U.S. Application Data

(63) Continuation of application No. 17/394,164, filed on Aug. 4, 2021, now Pat. No. 11,670,040, which is a
(Continued)

(51) Int. Cl.
*G06T 15/20* (2011.01)
*G06T 5/50* (2006.01)
(Continued)

(52) U.S. Cl.
CPC .............. *G06T 15/205* (2013.01); *G06T 5/50* (2013.01); *G06T 5/77* (2024.01); *G06T 7/11* (2017.01); *G06T 7/194* (2017.01); *G06T 7/55* (2017.01)

(58) Field of Classification Search
CPC ........... G06T 15/205; G06T 7/55; G06T 7/94; G06T 7/11
(Continued)

(56) References Cited

U.S. PATENT DOCUMENTS

| 9,582,928 B2 | 2/2017 | Cho et al. |
| 9,740,023 B1 | 8/2017 | Ashwood |

(Continued)

FOREIGN PATENT DOCUMENTS

| CN | 102804231 A | 11/2012 |
| CN | 105704476 A | 6/2016 |
| GB | 2562037 A | 11/2018 |

OTHER PUBLICATIONS

De Oliveira Adriano Q. et al: "An Artifact-Type Aware DIBR Method for View Synthesis", IEEE Signal Processing Letters, vol. 25, No. 11, Sep. 14, 2018 (Sep. 14, 2018), pp. 1705-1709.
(Continued)

*Primary Examiner* — Thomas J Lett
(74) *Attorney, Agent, or Firm* — CM Law; Stephen J. Weed

(57) ABSTRACT

Systems and methods for rendering three-dimensional (3D) scenes having improved visual characteristics from a pair of 2D images having different viewpoints. The 3D scene is created by obtaining a first two-dimensional (2D) image of a scene object from a first viewpoint, obtaining a second 2D image of the scene object from a second viewpoint that is different than the first viewpoint, creating a depth map from the first and second 2D images, creating a 3D scene from the depth map and the first and second 2D images, detecting regions of the initial 3D scene with incomplete image information, reconstructing the detected regions of the 3D scene, determining replacement information and modify the reconstructed regions, and rendering the 3D scene with the modified reconstructed regions from a plurality of viewpoints.

20 Claims, 4 Drawing Sheets

Related U.S. Application Data continuation of application No. 16/559,852, filed on Sep. 4, 2019, now Pat. No. 11,094,108.

(60) Provisional application No. 62/737,280, filed on Sep. 27, 2018.

(51) Int. Cl.
  *G06T 5/77* (2024.01)
  *G06T 7/11* (2017.01)
  *G06T 7/194* (2017.01)
  *G06T 7/55* (2017.01)

(58) Field of Classification Search
  USPC .......................................................... 345/419
  See application file for complete search history.

(56) References Cited

U.S. PATENT DOCUMENTS

| | | |
|---|---|---|
| 11,094,108 B2 | 8/2021 | Daube et al. |
| 11,670,040 B2 | 6/2023 | Daube et al. |
| 2008/0267527 A1 | 10/2008 | Berretty |
| 2009/0322671 A1* | 12/2009 | Scott ........................ G06F 3/013 345/173 |
| 2011/0109720 A1 | 5/2011 | Smolic et al. |
| 2012/0014456 A1* | 1/2012 | Martinez Bauza .... H04N 19/42 348/42 |
| 2012/0243774 A1 | 9/2012 | Chen et al. |
| 2012/0281906 A1* | 11/2012 | Appia ....................... G06T 7/593 382/154 |
| 2013/0127844 A1 | 5/2013 | Koeppel et al. |
| 2014/0085435 A1* | 3/2014 | Doyen .................. H04N 13/111 348/51 |
| 2014/0098100 A1 | 4/2014 | Dane et al. |
| 2014/0118509 A1 | 5/2014 | Kroon et al. |
| 2014/0285623 A1* | 9/2014 | Bruls .................... H04N 13/128 348/43 |
| 2015/0042752 A1* | 2/2015 | Pettersson ............ H04N 13/106 348/42 |
| 2015/0109297 A1* | 4/2015 | Panteleev ................ G06T 15/80 345/424 |
| 2015/0312547 A1* | 10/2015 | Cucca .................. H04N 13/172 348/43 |
| 2015/0382025 A1 | 12/2015 | Gu et al. |
| 2016/0073094 A1 | 3/2016 | Kang et al. |
| 2016/0232705 A1 | 8/2016 | Ramalingam |
| 2017/0070751 A1 | 3/2017 | Shimizu et al. |
| 2017/0171534 A1* | 6/2017 | Kondiparthi ......... H04N 13/366 |
| 2018/0018805 A1 | 1/2018 | Kutliroff et al. |
| 2018/0041746 A1 | 2/2018 | Lin et al. |
| 2018/0139431 A1 | 5/2018 | Simek et al. |
| 2018/0218510 A1 | 8/2018 | Taguchi et al. |
| 2018/0300937 A1 | 10/2018 | Chien et al. |
| 2019/0178673 A1* | 6/2019 | Strawn .................... G06T 17/05 |
| 2019/0304164 A1 | 10/2019 | Zhang |
| 2020/0066029 A1 | 2/2020 | Chen et al. |

OTHER PUBLICATIONS

Extended European Search Report for European Application No. 19864609.3, dated Jun. 1, 2022 (Jun. 1, 2022)—8 pages.

International Search Report and Written Opinion for International Application No. PCT/US2019/049455, dated Dec. 26, 2019 (Dec. 23, 2019)—11 pages.

Patrick Ndjiki-Nya et al.: Depth Image-Based Rendering with Advanced Texture Synthesis for 3-D Video. IEEE Transactions on Multimedia, vol. 13, No. 3, Jun. 2011, pp. 453-465.

1st Chinese Office Action for Chinese Application No. 201980062166.7 dated Oct. 21, 2024 (Oct. 21, 2024)—9 pages (English summary—2 pages).

* cited by examiner

THREE DIMENSIONAL SCENE INPAINTING USING STEREO EXTRACTION

CROSS-REFERENCE TO RELATED APPLICATIONS

This application in a Continuation of U.S. application Ser. No. 17/394,164 filed on Aug. 4, 2021, which is a Continuation of U.S. application Ser. No. 16/559,852 filed Sep. 4, 2019, now U.S. Pat. No. 11,094,108, and claims priority to U.S. Provisional Application Ser. No. 62/737,280 filed on Sep. 27, 2018, the contents of all of which are incorporated fully herein by reference.

TECHNICAL FIELD

The present invention relates to rendering 3D scenes and, more particularly, systems and methods for rendering 3D scenes having improved visual characteristics from a pair of 2D images having different viewpoints.

BACKGROUND OF THE INVENTION

Computer systems use rendering procedures to present three-dimensional (3D) scene objects on a two-dimensional (2D) display. To create a 3D representation of the scene objects, the computer system obtains geometric information of the scene objects from multiple 2D images having different viewpoints. The computer system then creates a depth map from the obtained geometric information for use in creating and rendering the 3D scene on the 2D display.

A depth map is an image that contains information relating to the distance of the surfaces of scene objects from a viewpoint of imagers capturing 2D images of the scene objects. The depth is sometimes referred to as Z-depth, which refers to a convention that the central axis of view of an imager is in the direction of the imager's Z-axis, and not to the absolute Z-axis of a scene.

The computer system presents a 3D scene on a 2D display for viewing and manipulation by a user and the user is able to manipulate the scene objects of the 3D scene by changing the viewpoint of the 3D scene. For viewpoints of the scene objects where the 3D scene does not include accurate information (e.g., a color value, a depth value, and/or an object value because some aspects of an object/scene are not present in one or more of the 2D images obtained from the limited number of viewpoints used to create the 3D), the computer system will attempt to complete the scene using the information from adjacent pixels. When the computer system attempts to complete the scene (e.g., using information from adjacent pixels), the resultant scene often includes unrealistic looking shapes and/or colors (e.g., a "stretching" effect of colors).

To minimize the unrealistic looking shapes and/or colors, prior art techniques often obtain many more than two 2D images from two respective viewpoints (e.g., a panorama of images). Obtaining a panorama of images from multiple viewpoints increases the likelihood that at least one viewpoint of the scene objects includes information for use in generating the 3D scene from various viewpoints, thereby improving display accuracy. Such techniques, however, require a relatively large amount of processing time/power as compared to creating a 3D scene from just two 2D images.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

In the following detailed description, numerous specific details are set forth by way of examples in order to provide a thorough understanding of the relevant teachings. However, it should be apparent to those skilled in the art that such details are not necessary to practice the present teachings. In other instances, a relatively high-level description, without detail, of well-known methods, procedures, components, and circuitry avoids unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices do not necessarily have to physically be in touch with one another and may be separated by airspace, intermediate components, elements or communication media that may modify, manipulate or carry the light or signals.

The orientations of the eyewear, associated components, and any devices shown in any of the drawings, are by way of example only, for illustration and discussion purposes. In operation, orientation of the eyewear may be in other directions suitable to the particular application of the eyewear, for example up, down, sideways, or any other orientation. Also, any directional term, such as front, rear, inwards, outwards, towards, left, right, lateral, longitudinal, up, down, upper, lower, top, bottom and side, is exemplary, and not limiting, as to direction or orientation.

Figure 1A:
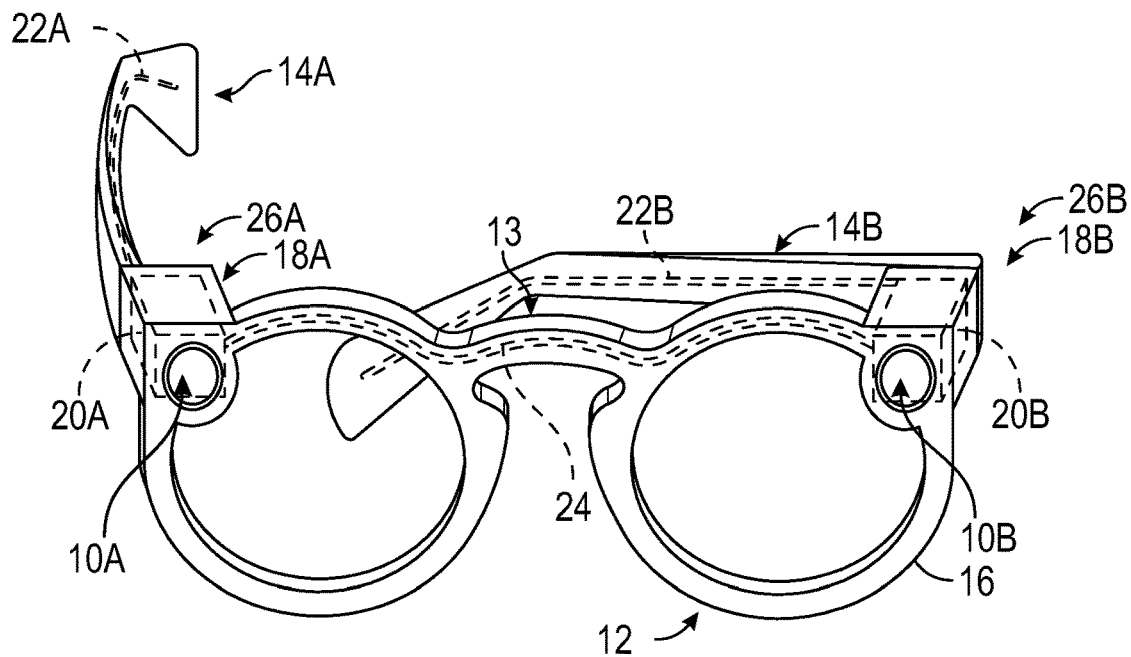
FIG. 1A is a perspective view of an eyewear example including electronic components and a support structure supporting the electronic components.

FIG. 1A depicts a front perspective view of example eyewear 12 for capturing images. The illustrated eyewear 12 includes a support structure 13 that has temples 14A and 14B extending from a central frame portion 16. The eyewear 12 additionally includes articulated joints 18A and 18B, electronic components 20A and 20B, and core wires 22A, 22B and 24. Although the illustrated eyewear are glasses, the eyewear may take other forms such as a headset, head gear, helmet, or other device that may be worn by a user.

Support structure 13 supports one or more optical elements within a field of view of a user when worn by the user. For example, central frame portion 16 supports the one or more optical elements. As used herein, the term "optical elements" refers to lenses, transparent pieces of glass or plastic, projectors, screens, displays and other devices for presenting visual images or through which a user perceives visual images. In an example, respective temples 14A and 14B connect to the central frame portion 16 at respective articulated joints 18A and 18B. The illustrated temples 14A and 14B are elongate members having core wires 22A and 22B extending longitudinally therein.

Temple 14A is illustrated in a wearable condition and temple 14B is illustrated in a collapsed condition in FIG. 1A. As shown in FIG. 1A, articulated joint 18A connects temple 14A to a right end portion 26A of central frame portion 16. Similarly, articulated joint 18B connects temple 14B to a left end portion 26B of central frame portion 16. The right end portion 26A of central frame portion 16 includes a housing that carries electronic components 20A therein, and left end portion 26B includes a housing that carries electronic components 20B therein.

A plastics material or other material embeds core wire 22A, which extends longitudinally from adjacent articulated joint 18A toward a second longitudinal end of temple 14A. Similarly, the plastics material or other material also embeds core wire 22B, which extends longitudinally from adjacent articulated joint 18B toward a second longitudinal end of temple 14B. The plastics material or other material additionally embeds core wire 24, which extends from the right end portion 26A (terminating adjacent electronic components 20A) to left end portion 26B (terminating adjacent electronic components 20B).

Electronic components 20A and 20B are carried by support structure 13 (e.g., by either or both of temple(s) 14A, 14B and/or central frame portion 16). Electronic components 20A and 20B include a power source, power and communication related circuitry, communication devices, display devices, a computer, a memory, modules, and/or the like (not shown). Electronic components 20A and 20B may each include a respective imager 10A and 10B for capturing images and/or videos. In the illustrated example, imager 10A is adjacent the right temple 14A and imager 10B is adjacent the left temple 14B. The imagers 10A and 10B are spaced from one another in order to obtain images of scene objects from two different viewpoints for use in generating 3D scenes.

Figure 1B:
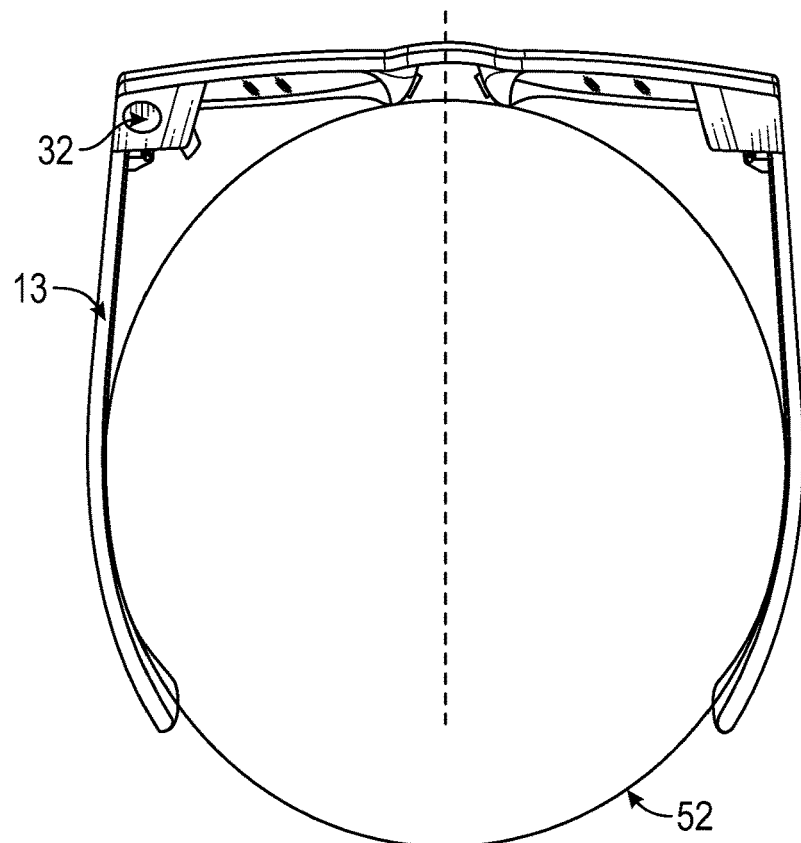
FIG. 1B is a top view of the eyewear example of FIG. 1A illustrating a region defined by the eyewear for receiving a head of a user wearing the eyewear.

Support structure 13 defines a region (e.g., region 52 (FIG. 1B) defined by the frame 12 and temples 14A and 14B) for receiving a portion 52 (e.g., the main portion) of the head of the user/wearer. The defined region(s) are one or more regions containing at least a portion of the head of a user that are encompassed by, surrounded by, adjacent, and/or near the support structure when the user is wearing the eyewear 12. In the illustrated example, the imagers 14A and 14B are positioned on the eyewear such that they are adjacent the respective eyes of a user when the eyewear 12 is worn, which facilitates obtaining a separation of viewpoints suitable for creating 3D scenes.

Figure 2:
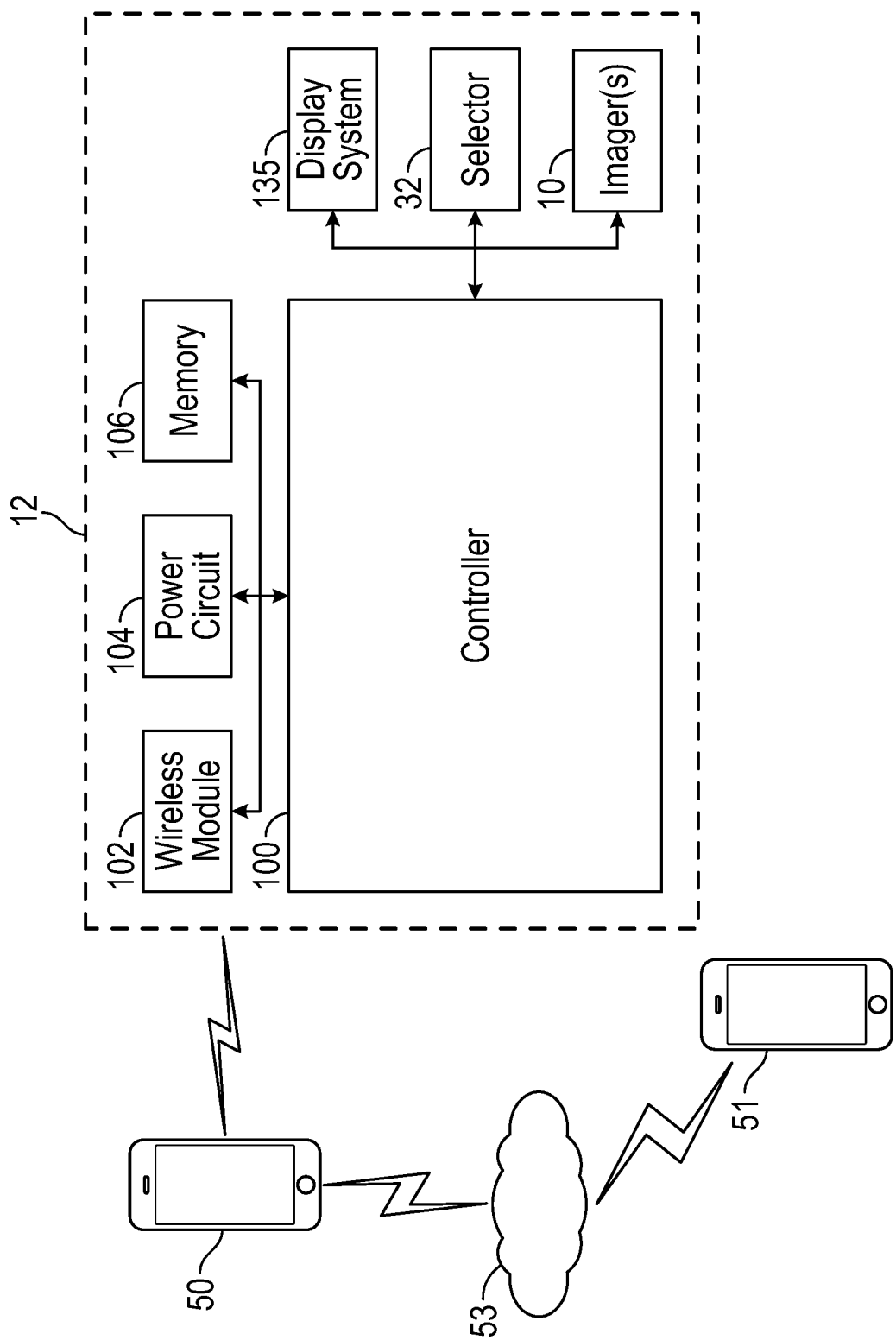
FIG. 2 is a block diagram of an example of the electronic components supported by the eyewear example of FIG. 1A, and communication with a personal computing device and a recipient.

FIG. 2 is a block diagram of example electronic components coupled to a display system 135 (e.g., a display of a processing device or other technique for presenting information). The illustrated electronic components include a controller 100 (e.g., hardware processor) for controlling the various devices in the eyewear 12; a wireless module (e.g., Bluetooth™) 102 for facilitating communication between the eyewear 12 and a client device (e.g., a personal computing device 50 such as a smartphone); a power circuit 104 (e.g., battery, filter, etc.) for powering eyewear 12; a memory 106 such as flash storage for storing data (e.g., images, video, image processing software, etc.); a selector 32; and one or more imagers 10 (two in the illustrated examples) for capturing one or more images (e.g., a picture or a video). Although the eyewear 12 and the personal computing device are illustrated as separate components, the functionality of the personal computing device may be incorporated into the eyewear enabling the personal computing device and/or the eyewear 12 to perform functionality described herein.

The selector 32 may trigger (e.g., via a momentary push of a button) controller 100 of eyewear 12 to capture images/video. In examples where a single selector 32 is utilized, the selector may be used in a set up mode (e.g., entered by pressing and holding the selector 32 for a period of time, e.g., 3 seconds) and in an image capture mode (e.g., entered after a period of time with no contact, e.g., 5 seconds) to capture images.

In an example, the selector 32 may be a physical button on the eyewear 12 that, when pressed, sends a user input signal to the controller 100. The controller 100 may interpret pressing the button for a predetermined period of time (e.g., three seconds) as a request to transition to a different mode of operation (e.g., in/out of a set-up mode of operation). In other examples, the selector 32 may be a virtual button on the eyewear or another device. In yet another example, the selector may be a voice module that interprets voice commands or an eye detection module that detects where the focus of an eye is directed. Controller 100 may interpret signals from selector 32 as a trigger to cycle through illuminating LEDs to select an intended recipient of the image(s).

Wireless module 102 may couple with a client/personal computing device 50 such as a smartphone, tablet, phablet, laptop computer, desktop computer, networked appliance, access point device, or any other such device capable of connecting with wireless module 102. Bluetooth, Bluetooth LE, Wi-Fi, Wi-Fi direct, a cellular modem, and a near field communication system, as well as multiple instances of any of these systems, for example, may implement these connection to enable communication there between. For example, communication between the devices may facilitate transfer of software updates, images, videos, lighting schemes, and/or sound between eyewear 12 and the client device.

In addition, personal computing device 50 may be in communication with one or more recipients (e.g., recipient personal computing device 51) via a network 53. The network 53 may be a cellular network, Wi-Fi, the Internet or the like that allows personal computing devices to transmit and receive an image(s), e.g., via text, email, instant messaging, etc. The computing devices 50/51 may each include a processor and a display. Suitable processors and displays, which may be configured to perform one more functions described herein, may be found in current generation personal computing devices and smartphones such as the iPhone 8' available from Apple Inc. of Cupertino, California and the Samsung Galaxy Note 9' available from the Samsung Group of Seoul, South Korea.

The imager(s) 10 for capturing the images/video may include digital camera elements such as a charge-coupled device, a lens, or any other light capturing elements for capturing image data for conversion into an electrical signal(s).

The controller 100 controls the electronic components. For example, controller 100 includes circuitry to receive signals from imager 10 and process those signals into a format suitable for storage in memory 106 (e.g., flash storage). Controller 100 powers on and boots to operate in a normal operational mode, or to enter a sleep mode. In one example, controller 100 includes a microprocessor integrated circuit (IC) customized for processing sensor data from imager 10, along with volatile memory used by the microprocessor to operate. The memory may store software code for execution by controller 100.

Each of the electronic components require power to operate. Power circuit 104 may include a battery, power converter, and distribution circuitry (not shown). The battery may be a rechargeable battery such as lithium-ion or the like. Power converter and distribution circuitry may include electrical components for filtering and/or converting voltages for powering the various electronic components.

Figure 3A:
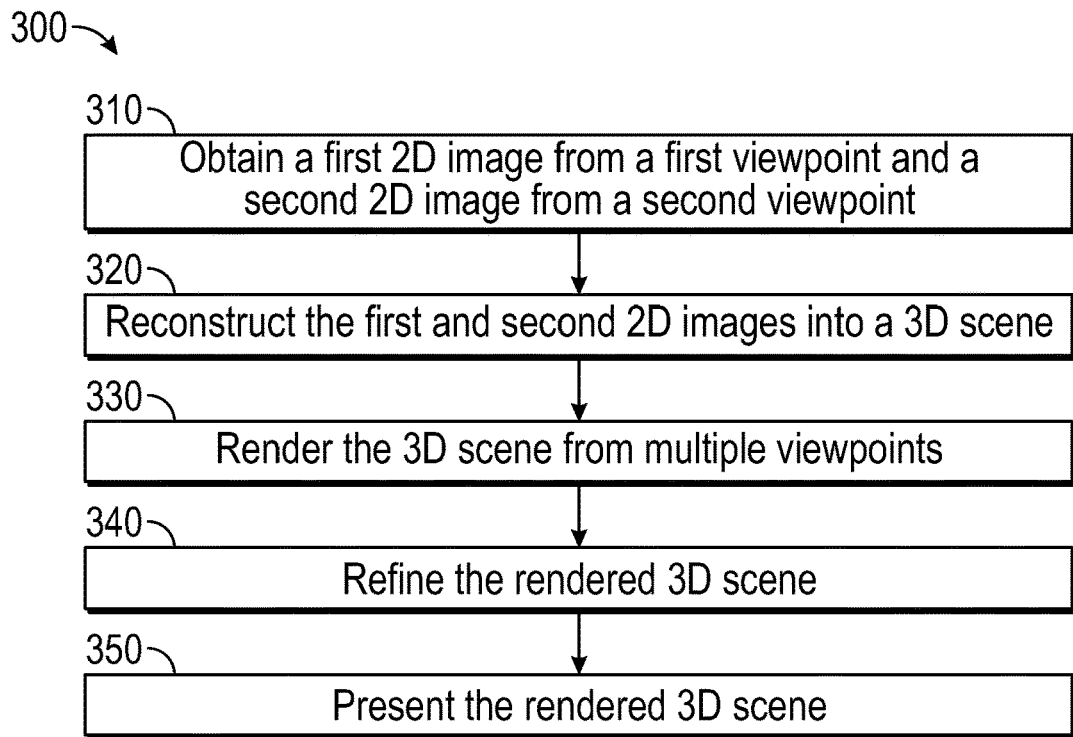
FIG. 3A is a flow chart of example steps for rendering a 3D scene.

FIG. 3A depicts a flow chart 300 illustrating example operation of eyewear (e.g., eyewear 12 of FIG. 1A) and 3D scene rendering by a processing system (e.g., by a processor of eyewear 12 and/or the processor of a computing device remote to the eyewear. For ease of explanation, the steps of flow chart 300 are described with reference to eyewear 12 described herein. One of skill in the art will recognize other imager configurations not tied to eyewear for use in rendering 3D scenes. Additionally, it is to be understood that one or more of the steps may be omitted, performed by another component, or performed in a different order.

At step 310, obtain a first 2D image of a scene object from a first viewpoint and a second 2D image of the scene object from a second viewpoint. In an example, a first imager 10A of the eyewear 12 captures the first 2D image of the scene object from the first viewpoint and a second imager 10B of the eyewear 12 captures the second 2D image of the scene object from the second viewpoint. The captured images pass from the imagers 10A and 10B to a processing system for rendering of a 3D scene. In one example, the controller 100 of the eyewear 12 obtains the 2D images and renders the 3D scene from the obtained 2D images. In another example, the controller 100 receives the 2D images and transmits them to a processing system of a remote computing device 50/51 for rendering of the 3D scene.

At step 320, reconstruct the first and second 2D images into a 3D scene of the scene object. The processing system reconstructs the first and second 2D images into the 3D scene of the scene object. The processing system may apply a stereo-vision processing technique (i.e., to create a depth map) and geometric processing technique to create the 3D scene. In an example, the rendered 3D scene includes geometric features (e.g., vertices with x-axis, y-axis, and z-axis coordinates) along with image information (e.g., color information, depth information, and object information). The rendered 3D scene will also include connective as multi-angular faces, e.g., typically triangular faces or quadrangular faces, connecting the vertices to make up the textured surfaces of the scene objects. Suitable stereo-vision processing techniques and geometric processing techniques will be understood by one of skill in the art from the description herein.

Figure 3B:
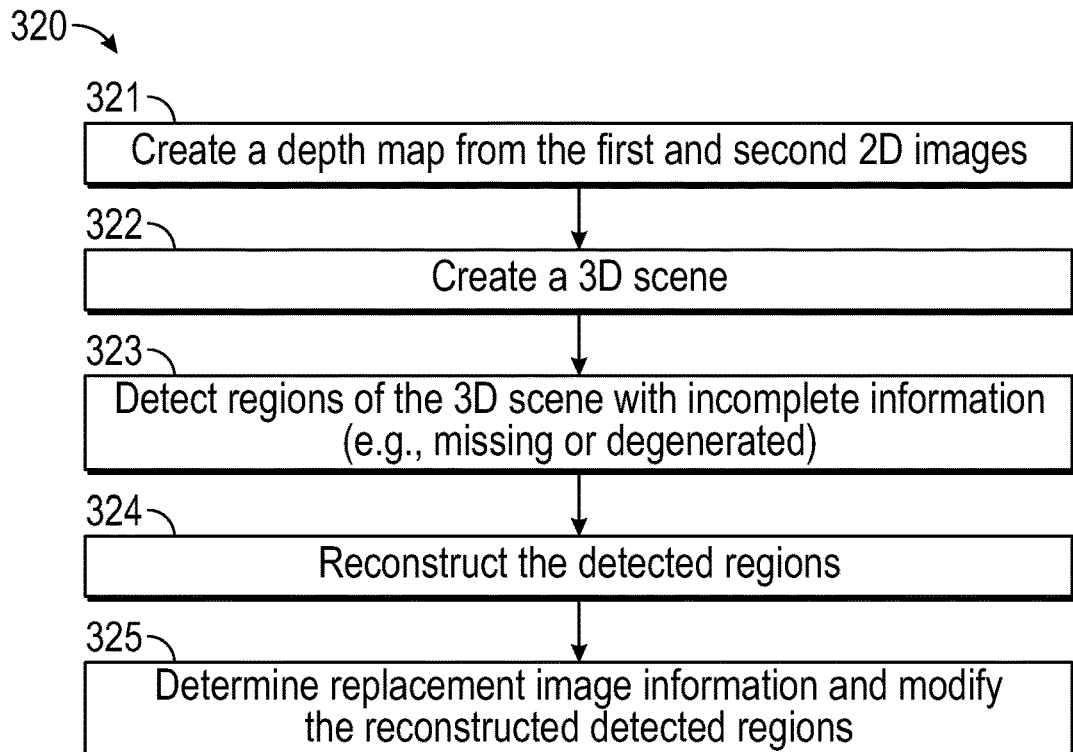
FIG. 3B is a flow chart of example steps for reconstructing first and second 2D images into a 3D scene in FIG. 3A.

FIG. 3B depicts a flowchart of example steps for reconstructing the first and second 2D images into a 3D scene of the scene object (step 320; FIG. 3A). At step 321 create a depth map from the first and second 2D images. The processing system may create a depth map by processing the first and second 2D images using a stereo-vision processing technique. At step 322 create a 3D scene from the first and second 2D images. The processing system may create a 3D scene by geometrically processing the first and second 2D images along with the depth map created in step 321.

At step 323 detect regions of the 3D scene with incomplete image information. The processing system may detect regions of the 3D scene with incomplete image information (e.g., missing color, depth, and/or object information). For example, the processing system may determine incomplete information by inspecting the shape of the faces making up the 3D scene and/or information such as confidence values associated with the vertices making up the faces.

Figure 3C:
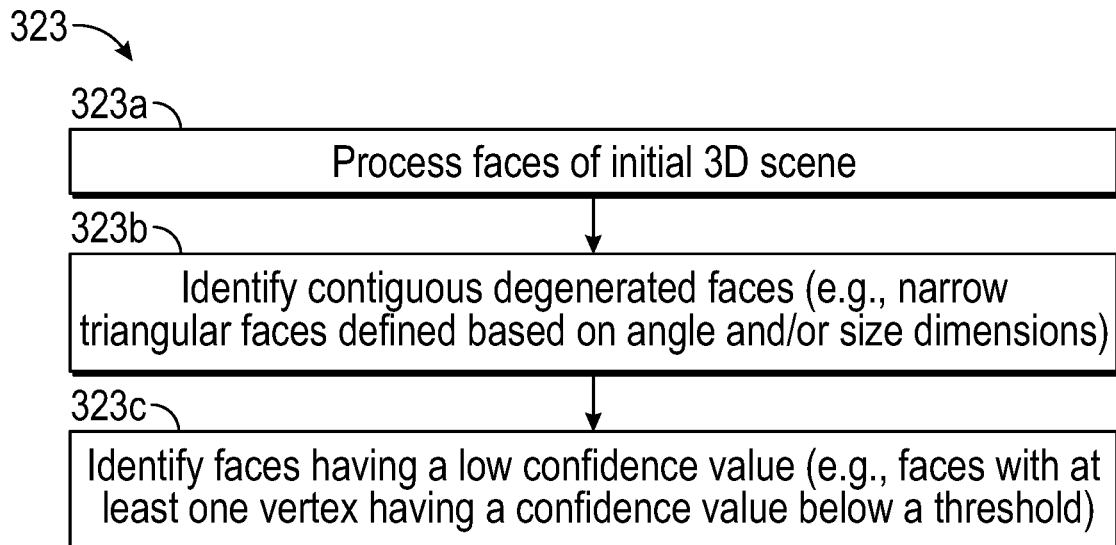
FIG. 3C is a flow chart of example steps for detecting regions of the 3D scene with incomplete information in FIG. 3B.

In an example, the processing system processes faces of the reconstructed 3D scene (step 323a; FIG. 3C) to identify groups of contiguous faces exhibiting characteristics of incomplete information, e.g., very narrow faces and/or faces with one or more vertex having a low confidence value.

The processing system may identify contiguous regions having degenerated faces (e.g., relatively narrow faces) as regions with incomplete information (step 323b; FIG. 3C). Faces that are relatively narrow may be determined by comparing the angles between adjacent lines of the faces to a threshold value, e.g., faces including at least one angle that is less than a threshold such as 5 degrees, faces having one side with a length that is less than 5% the length of another side, and/or faces having one side that is below a threshold dimension, such a 1 millimeter, may categorized as narrow.

The processing system may also, or alternatively, identity faces having a low confidence values (e.g., faces with at least one vertex having a confidence value below a threshold value) as regions with incomplete information (step 323c; FIG. 3C). The confidence value of a vertex may be the confidence value of a corresponding pixel determined during stereo processing of the first and second 2D images to create the depth map (described above).

The confidence value for a vertex corresponding to a pixel depends on the matching/correlation between the first and second 2D images in creating the pixel. If there is a high correlation (e.g., 75% or above) there is a relatively high likelihood that the vertex includes accurate information that is useful for reconstruction into the 3D scene. On the other hand, if there is low correlation (e.g., below 75%) there is a relatively high likelihood that the vertex does not include information that is accurate enough to be useful for reconstruction into the 3D scene.

At step 324 reconstruct the detected region. In an example, the processing system reconstructs the detected region of the 3D scene, e.g., using geometric processing such as described above for step 322. In reconstructing the detected region, the processing system may ignore vertices having low confidence values and/or associated with degenerated faces. This results is fewer, if any, degenerated faces (e.g., relatively narrow faces). Thus, the faces in the detected region will have a different shape after this reconstruction step. The faces in the detected region may be removed prior to reconstruction. In an example, a data structure such as Indexed-Face-Set for 3D meshes may be used that includes an ordered list of all vertices (and their attributes, e.g., color, texture, etc.) and a list of faces, where each face refers to the vertex index in the vertices list. In this example, a face may be removed by removing it from the faces list.

At step 325 determine replacement image information and modify the reconstructed detected regions. The processing system may determine the replacement image information for the reconstructed detected regions and modify the 3D scene to include the replacement image information in the detected regions as they are being reconstructed. For example, the processing system may determine replacement image information for each of the detected regions by blending boundary information from the respective boundaries of each of the detected regions.

Figure 3D:
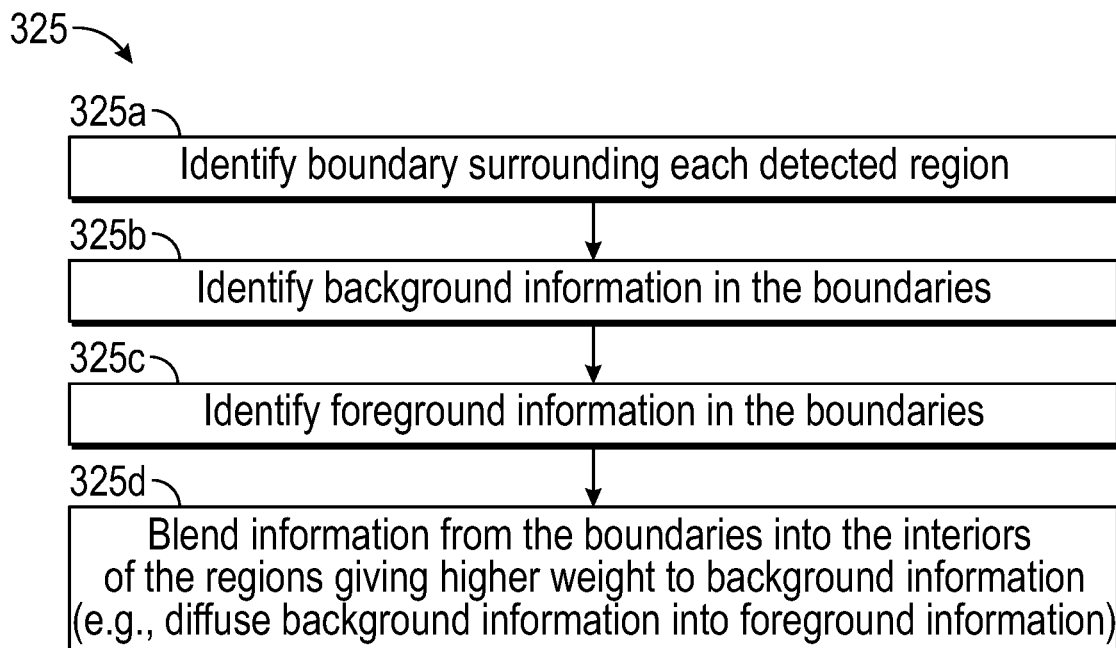
FIG. 3D is a flow chart of example steps for determining replacement image information in FIG. 3B.

In an example, to determine replacement image information, the processing system identifies a boundary surrounding each detected region (step 325a; FIG. 3D). The processing system then identifies background information in the detected regions (step 325b; FIG. 3D); e.g., based on depth information associated with the vertices in along the boundary. The processing system also identifies foreground information in the detected regions (step 325c; FIG. 3D); e.g., also based on depth information. To identify background/foreground information, the processing system may compare the depth information of each vertex to a threshold value (e.g., an average value of the depth information from all vertices), identify information associated with a vertex having a depth greater than the threshold value as background information, and identify information associated with a vertex having a depth less than the threshold value as foreground information. The processing system then blends information from the boundaries through the respective regions (step 325d; FIG. 3D) giving the background information higher weight than the foreground information. This results in a diffusion of information primarily from the background to the foreground.

Referring back to FIG. 3A, at step 330 render the 3D scene from multiple viewpoints. The processing system may render the 3D scene from the multiple viewpoints, e.g., by applying an image synthesis technique to the 3D scene to create a 2D image from each viewpoint. Suitable image synthesis techniques will be understood by one of skill in the art from the description herein.

At step 340 refine the rendered 3D scene. The processing system may refine the 3D scene from each of the multiple viewpoints. In an example, the processing system identified regions in the 2D images of the rendered 3D scene where there are gaps in image information (i.e., "holes'). The processing system then fills in these holes using replacement image information surrounding these holes. The processing system may fill in the holes giving preferential weight to background information surrounding the holes.

At step 350 present the rendered 3D scene. The processing system may present the rendered 3D scene on a display of the eyewear or a remote computing device by selectively presenting the 2D image within the rendered 3d scene associated with a selected point of view (e.g., based on a user input to the eyewear device or the remote computing device).

By performing the above process described with reference to flow chart 300, a more aesthetically pleasing 3D scene viewable from more viewpoints (e.g., reduction is color stretching) is obtainable from just two 2D images without having to resort to panoramic views. Thus, superior results can be achieved without resorting to computationally intensive techniques.

It is to be understood that the steps of the processes described herein may be performed by a hardware processor upon loading and executing software code or instructions which are tangibly stored on a tangible computer readable medium, such as on a magnetic medium, a computer hard drive, an optical disc, solid-state memory, flash memory, or other storage media known in the art. Thus, any of the functionality performed by the processor described herein may be implemented in software code or instructions which are tangibly stored on a tangible computer readable medium. Upon loading and executing such software code or instructions by the processor, the processor may perform any of the functionalities described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although an overview of the inventive subject matter has been described with reference to specific examples, various modifications and changes may be made to these examples without departing from the broader scope of examples of the present disclosure. For example, although the description focuses on an eyewear device, other electronic devices such as headphones are considered within the scope of the inventive subject matter. Such examples of the inventive subject matter may be referred to herein, individually or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

The invention claimed is:

1. A system for creating a three-dimensional (3D) scene, the system comprising:
 eyewear including a first imager and a second imager spaced from the first imager, the first imager configured to obtain a first two-dimensional (2D) image of a scene object from a first viewpoint and the second imager configured to obtain a second 2D image of the scene object from a second viewpoint that is different than the first viewpoint; and
 a processing system coupled to the eyewear, the processing system configured to:
  create a 3D scene from the first and second 2D images;
  detect regions of the 3D scene with incomplete image information by identifying faces of the 3D scene having at least one vertex with a confidence value that is less than a threshold value;
  reconstruct the detected regions of the 3D scene;
  determine replacement information and modify the reconstructed regions; and
  render the 3D scene with the modified reconstructed regions from a plurality of viewpoints.

2. The system of claim 1, wherein the processing system is further configured to:

identify holes in the rendered 3D scene from one or more viewpoints; and refine the rendered 3D scene to fill in the holes.

3. The system of claim 1, wherein the eyewear includes a first temple and a second temple and wherein the first imager is adjacent the first temple and the second imager is adjacent the second temple.

4. The system of claim 1, wherein to determine replacement information for the detected regions with incomplete image information the processing system is configured to:
identify a boundary surrounding each detected region;
identify background information in the boundary surrounding each detected region;
identify foreground information in the boundary surrounding each detected region; and
blend the background and foreground information through each detected region giving the background information higher weight than the foreground information.

5. The system of claim 4, wherein to blend the background and foreground boundary information, the processing system is configured to:
diffuse missing information from the background information through each detected region into the foreground information.

6. The system of claim 1, wherein the processing system is further configured to:
create a depth map including pixel vertices and corresponding image information from the first and second 2D images;
wherein to create the 3D scene the processing system connects the vertices to form first faces and to construct the detected regions the processing system connects the vertices of boundary regions to form second faces, the second faces being different than the first faces.

7. The system of claim 1, wherein the processing system is further configured to:
create a depth map including pixel vertices and confidence values corresponding to each vertex;
wherein to create the 3D scene the processing system is configured to connect the vertices to form the faces.

8. The system of claim 1, wherein the processing system is further configured to:
create a depth map including pixel vertices and confidence values corresponding to each vertex;
wherein to create the 3D scene the processing system is configured to connect the vertices to form the faces;
wherein faces including at least one vertex generated with a low correlation between the first 2D image and the second 2D image are identified as having a confidence value below the threshold.

9. A method for creating a three-dimensional (3D) scene, the method comprising:
obtaining a first two-dimensional (2D) image of a scene object from a first viewpoint;
obtaining a second 2D image of the scene object from a second viewpoint that is different than the first viewpoint;
creating a 3D scene from the first and second 2D images;
detecting regions of the 3D scene with incomplete image information by identifying faces of the 3D scene having at least one vertex with a confidence value that is less than a threshold value;
reconstructing the detected regions of the 3D scene;
determining replacement information and modify the reconstructed regions; and rendering the 3D scene with the modified reconstructed regions from a plurality of viewpoints.

10. The method of claim 9, further comprising:
identifying holes in the rendered 3D scene from one or more viewpoints; and
refining the rendered 3D scene to fill in the holes.

11. The method of claim 9, wherein the first 2D image is obtained from a first imager and the second 2D image is obtained from a second imager.

12. The method of claim 9, wherein the determining step comprises:
identifying a boundary surrounding each detected region;
identifying background information in the boundary surrounding each detected region;
identifying foreground information in the boundary surrounding each detected region; and
blending the background and foreground information through each detected region giving the background information higher weight than the foreground information.

13. The method of claim 12, wherein the blending comprises:
diffusing missing information from the background information through each detected region into the foreground information.

14. The method of claim 9, wherein the creating the 3D scene comprises creating a depth map including pixel vertices and corresponding image information from the first and second 2D images and connecting the vertices to form first faces, and wherein the reconstructing step further includes:
connecting the vertices of boundary regions to form second faces, wherein the second faces are different than the first faces.

15. The method of claim 14, wherein the first and second faces include at least one of triangular faces or quadrangular faces.

16. The method of claim 9, wherein the creating the 3D scene comprises creating a depth map including pixel vertices and corresponding image information from the first and second 2D images and connecting the vertices to form multi-angular faces.

17. The method of claim 9, wherein the creating the 3D scene comprises creating a depth map including pixel vertices and corresponding image information from the first and second 2D images and connecting the vertices to form multi-angular faces:
wherein faces including at least one vertex generated with a low correlation between the first 2D image and the second 2D image are identified as having a confidence value below the threshold.

18. A non-transitory computer-readable medium including instructions for creating a three-dimensional (3D) scene when executed by a processor, the instructions comprising:
obtaining a first two-dimensional (2D) image of a scene object from a first viewpoint;
obtaining a second 2D image of the scene object from a second viewpoint that is different than the first viewpoint;
creating a 3D scene from the first and second 2D images;
detecting regions of the 3D scene with incomplete image information by identifying faces of the 3D scene having at least one vertex with confidence value that is less than a threshold value;
reconstructing the detected regions of the 3D scene;
determining replacement information and modify the reconstructed regions; and rendering the 3D scene with the modified reconstructed regions from a plurality of viewpoints.

19. The medium of claim 18, wherein the creating the 3D scene comprises creating a depth map including pixel vertices and corresponding image information from the first and second 2D images and connecting the vertices to form multi-angular faces:
   wherein faces including at least one vertex generated with a low correlation between the first 2D image and the second 2D image are identified as having a confidence value below the threshold.

20. The medium of claim 18, wherein the determining comprises:
   identifying a boundary surrounding each detected region;
   identifying background information in the boundary surrounding each detected region;
   identifying foreground information in the boundary surrounding each detected region; and
   blending the background and foreground information through each detected region giving the background information higher weight than the foreground information.

* * * * *